(12) United States Patent
Kraz

(10) Patent No.: US 7,589,537 B1
(45) Date of Patent: Sep. 15, 2009

(54) DEVICE AND METHOD OF MONITORING GROUND CONNECTION OF MOVING EQUIPMENT WITH INSULATIVE BEARING ARRANGEMENT

(75) Inventor: Vladimir Kraz, Santa Cruz, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/400,164

(22) Filed: Apr. 5, 2006

(51) Int. Cl.
*G01R 27/26* (2006.01)
*G01R 31/14* (2006.01)

(52) U.S. Cl. .......................... 324/658; 324/509
(58) Field of Classification Search ................ 324/658, 324/649, 600, 519, 686, 538, 558, 559, 500, 324/537, 765, 662, 663, 509; 73/514.32; 361/181
See application file for complete search history.

(56) References Cited

U.S. PATENT DOCUMENTS

| | | | | |
|---|---|---|---|---|
| 3,961,319 A | * | 6/1976 | Asberry ...................... 340/649 |
| 4,067,408 A | * | 1/1978 | Dodds et al. ............. 177/210 C |
| 4,083,041 A | * | 4/1978 | Bennice ...................... 340/650 |
| 4,339,709 A | * | 7/1982 | Brihier ....................... 324/725 |
| 4,960,177 A | * | 10/1990 | Holm-Kennedy et al. ........... 177/210 C |
| 5,014,043 A | * | 5/1991 | Lopetrone et al. ........... 340/664 |
| 5,036,286 A | * | 7/1991 | Holm-Kennedy et al. ... 324/661 |
| 5,223,795 A | * | 6/1993 | Blades ...................... 324/536 |
| 5,438,880 A | * | 8/1995 | Washburn ............... 73/861.65 |
| 5,557,209 A | * | 9/1996 | Crook et al. ................ 324/537 |
| 5,936,410 A | * | 8/1999 | Dunfield et al. ............. 324/662 |
| 6,067,858 A | * | 5/2000 | Clark et al. ............. 73/504.16 |
| 6,252,825 B1 | * | 6/2001 | Perotto ......................... 368/69 |
| 6,310,557 B1 | * | 10/2001 | Nelsen et al. ............... 340/649 |
| 6,414,600 B1 | * | 7/2002 | Plukphongrat et al. ...... 340/649 |
| 6,486,680 B1 | * | 11/2002 | Mull .......................... 324/662 |
| 6,515,489 B2 | * | 2/2003 | Min et al. ................... 324/662 |
| 6,804,094 B2 | * | 10/2004 | Kampmeyer ................. 361/42 |
| 6,930,612 B1 | * | 8/2005 | Kraz et al. .................. 340/649 |
| 6,988,408 B2 | * | 1/2006 | Cho ......................... 73/504.14 |
| 7,391,222 B2 | * | 6/2008 | Nishio ........................ 324/662 |

FOREIGN PATENT DOCUMENTS

| | | |
|---|---|---|
| EP | 1 174 871 A1 | 1/2002 |
| JP | 58207839 A | 12/1983 |
| JP | 5273282 A | 10/1993 |
| JP | 2001178095 A | 6/2001 |
| JP | 2002136056 A | 5/2002 |

\* cited by examiner

*Primary Examiner*—Hoai-An D. Nguyen
(74) *Attorney, Agent, or Firm*—Johannes P. M. Kusters

(57) ABSTRACT

A device and method of monitoring ground connection of moving equipment with insulative bearing arrangement is provided that does not use a spring contact that wears out and fails. The device provides a reliable method to monitor the ground connection of the moving equipment with an insulative bearing.

8 Claims, 7 Drawing Sheets

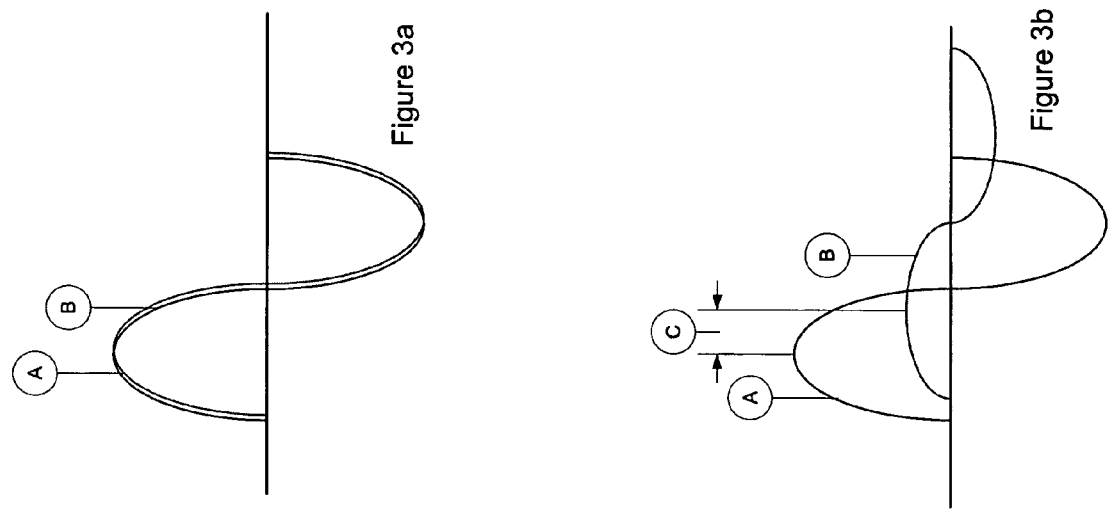
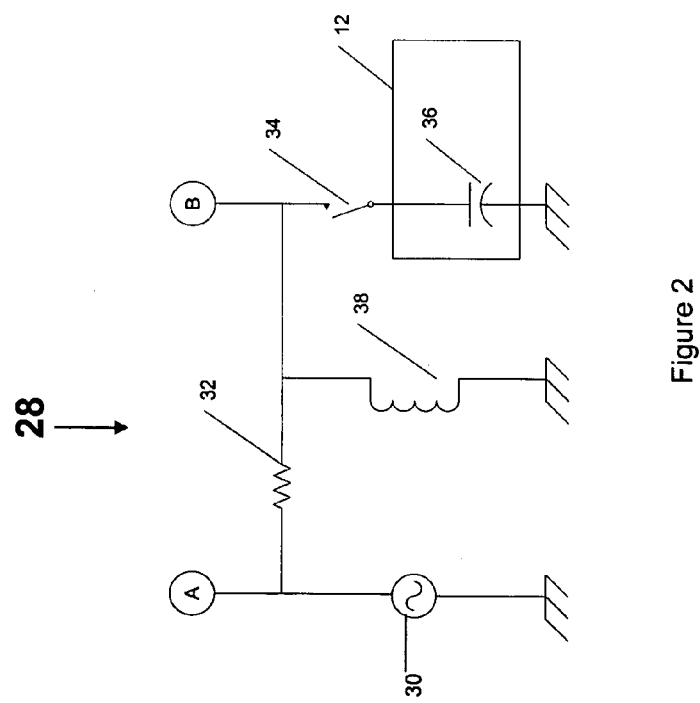

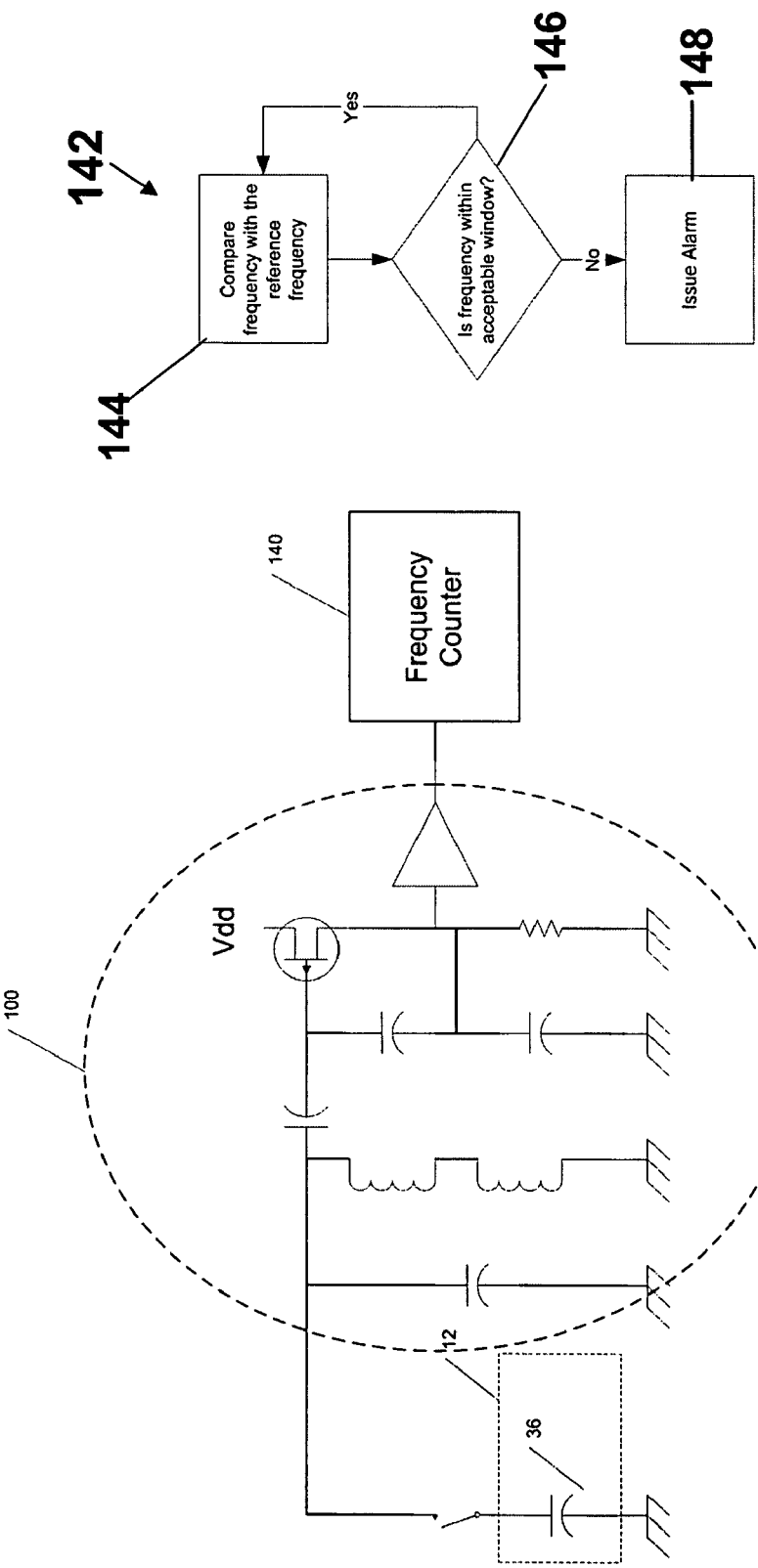

DEVICE AND METHOD OF MONITORING GROUND CONNECTION OF MOVING EQUIPMENT WITH INSULATIVE BEARING ARRANGEMENT

FIELD OF THE INVENTION

The invention relates generally to a device and method for monitoring a ground connection for a piece of equipment.

BACKGROUND OF THE INVENTION

Moving equipment that uses insulative bearing arrangement, such as air bearing spindles, cannot be adequately grounded during operation since the bearing arrangement used are by definition insulative. In static-sensitive (electrostatic discharge—ESD) applications, such as disk drive and semiconductor equipment, it is important to assure a good ground connection between a rotor of the spindle and ground. In a typical system, a spring-loaded connection between rotor and ground is used. FIG. 1a depicts an example of a typical arrangement with a spindle 10 with its rotor 12 separated from the stator by an insulative bearing 14, such as an air bearing in this example. In this particular application, the air spindle drives a disk drive platter 16 during a test and a magnetic head 18 used for the test can be easily damaged if the voltage on the platter 16 is high which can be caused when the platter 16 (and the rotor 12) is not being grounded properly.

The grounding of the rotor is typically accomplished by a spring-loaded contact 20 physically and electrically connected to the stator, or frame, via arrangement 22. This contact is electrically connected typically to a special contact 20 at the center of the rotor wherein the arrangement 22 extends and connects to the spindle 10 by a screw 24. The special contact is usually called "button" and this document uses this definition for clarity. The special connection shown in FIG. 1a is not reliable since the button 20 wears off and also the spring of this contact can relax due to fatigue and therefore interrupt the contact as shown in FIG. 1b. When the contact is interrupted, the ground connection is lost and dangerous exposure of sensitive components to voltages and currents can occur. It is desirable to provide a device and method for being able to monitor the connection between the rotor and ground reliably and does not rely on the spring contact.

A conventional method of monitoring a ground connection by continuity (such as is shown in a Ground Master product commercially available from Credence Technologies, Inc. with further details of this product found at http://www.credencetech.com/products/product.php?productId=CTC065,%20CTC065RT) cannot be employed in this case since only one electrical contact of monitored part is available.

Thus, it is desirable to provide a device and method of monitoring ground connection of moving equipment with insulative bearing arrangement and it is to this end that the present invention is directed.

SUMMARY OF THE INVENTION

A device and method of monitoring ground connection to moving equipment with insulative bearing arrangement is provided that utilizes measurements of parasitic capacitance between a moving member and a stationary member to determine whether the moving member is properly grounded via a contact. The device provides a reliable method to monitor the ground connection of the moving equipment with an insulative bearing.

Thus, in accordance with the invention; an object is provided that comprises a moving member, a stationary member separated from the moving member by an insulative bearing, and a circuit that measures a parasitic capacitance between the moving member and the stationary member by means of measuring capacitance between grounding contact and the stationary member in order to determine a connection to the moving member.

In accordance with another aspect of the invention, a device of monitoring the grounding of an object having a moving member and a stationary member separated by an insulative bearing is provided. The device has a circuit that measures a parasitic capacitance between a moving member and a stationary member, and a circuit that indicates a connection to the moving member.

In accordance with yet another aspect of the invention, a method for monitoring the grounding of an object having a moving member and a stationary member separated by an insulative bearing is provided. In the method, the parasitic capacitance between the moving member and the stationary member of the device is measured. Then, a connection to the moving member based on the measured parasitic capacitance is determined.

In all of the embodiments of the invention, the grounding of the moving member is provided by an adequate galvanic ground path between a contact connected to a moving member with properties allowing for measurements of capacitance.

BRIEF DESCRIPTION OF THE DRAWINGS

FIG. 2 illustrates an example of a preferred embodiment of a circuit that implements a method for monitoring the ground connection of a piece of equipment with an insulative bearing;

FIGS. 3a and 3b illustrate the waveforms generated by the device shown in FIG. 2;

FIGS. 8A and 8B illustrates an example of yet another embodiment of a device and method for monitoring the ground connection of a piece of equipment with an insulative bearing.

DETAILED DESCRIPTION OF A PREFERRED EMBODIMENT

The invention is particularly applicable to a device and method for monitoring the ground connection in a piece of equipment with an air bearing and it is in this context that the invention will be described. It will be appreciated, however, that the device and method in accordance with the invention has greater utility since the device may be used with any object or moving piece of equipment with an insulative bearing and it may be implemented using different circuits and components than those shown below in the diagrams and those other implementations of the device and method are within the scope of the invention.

FIG. 2 illustrates an example of a preferred embodiment of a circuit 28 that implements a method for monitoring the ground connection of a piece of equipment with an insulative bearing. Broadly, the method, circuit and device of the invention rely on parasitic capacitance between the rotor and the stator of the motor to monitor a connection and in particular a ground connection. Therefore, any circuit or device that implements a method in which the ground connection for a moving object with an insulative bearing is monitoring via parasitic capacitance is within the scope of the invention.

Figure 1B:
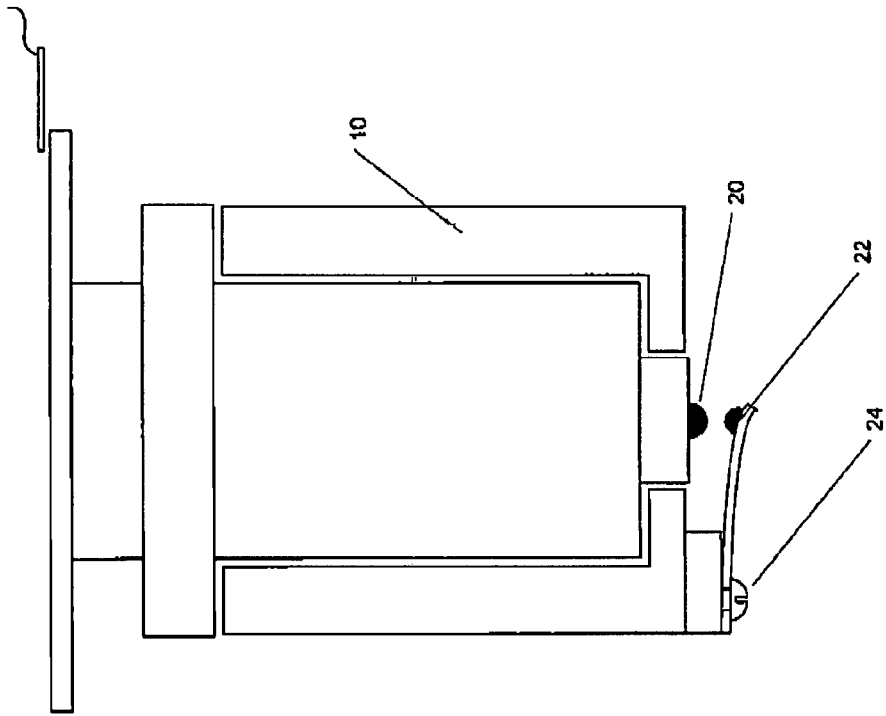
FIGS. 1a and 1b illustrate a typical device for monitoring the grounding of a piece of moving equipment with an insulative bearing.
Figure 1A:
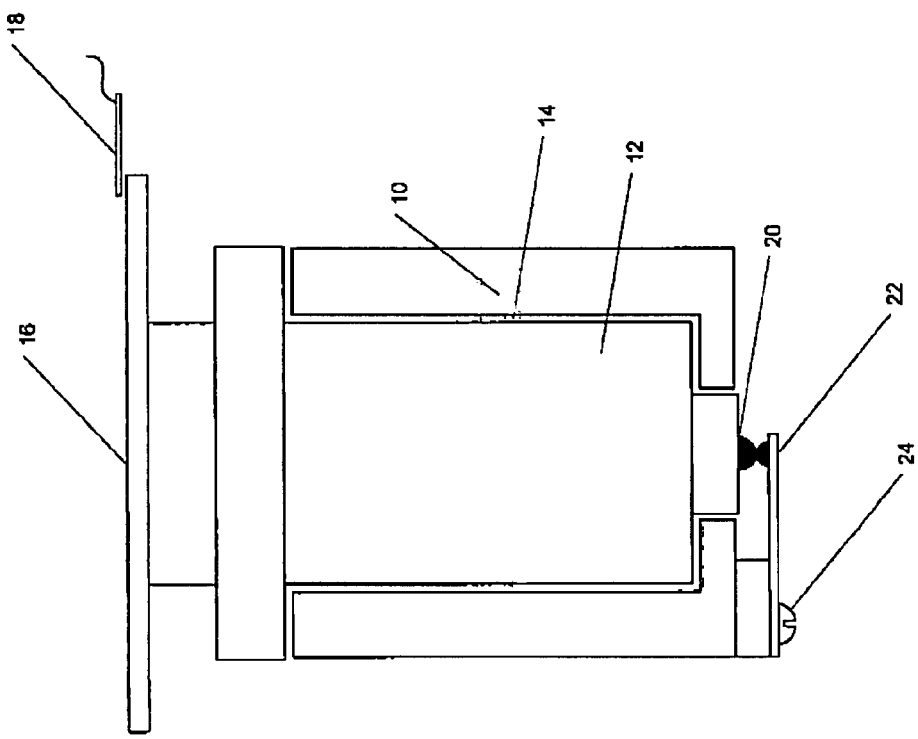

The circuit 28 may include a known alternating current (AC) signal oscillator 30 that provides an AC signal via a resistor 32 to a contact 34 (which performs the same function as the button 20 of FIG. 1a and may be implemented as the button 20). A parasitic capacitance between the rotor 12 and the stator is represented in FIG. 2 as a capacitor 36. An inductor 38 provides galvanic connection to ground while having high impedance at the frequencies that are being used for the monitoring of the ground connection. Using this method, the grounding is provided via the monitor circuit and not via the connection of the button 20 (FIG. 1a) to ground directly. In order to use this method, the contact 34 needs to be electrically separated from the stator/frame by using conventional methods, such as nylon screws and washers, etc.

FIGS. 3a and 3b illustrate the waveforms generated by the device shown in FIG. 2. In particular, when connection between the contact 34 and the rotor 12 is broken, the signals at points A and B in the circuit shown in FIG. 2 are essentially identical as seen in FIG. 3a However, if the contact between rotor 12 and the contact 34 is good, a capacitive load is introduced and as a result, the waveform at point B changes as shown in FIG. 3b. In particular, the waveform at point B is now both lower in amplitude and lags in phase (by a predetermined time lag C) as compared to the original signal at point A. In accordance with the invention, either of these phenomena (the difference in amplitude of the signals or the phase shift of the signals) can be exploited in order to monitor the connection between the contact and the rotor. An example of a device for monitoring the ground based on the phase shift/difference is described below with reference to FIG. 4 and an example of device for monitoring the ground based on the amplitude difference is described below with reference to FIG. 5.

Figure 4:
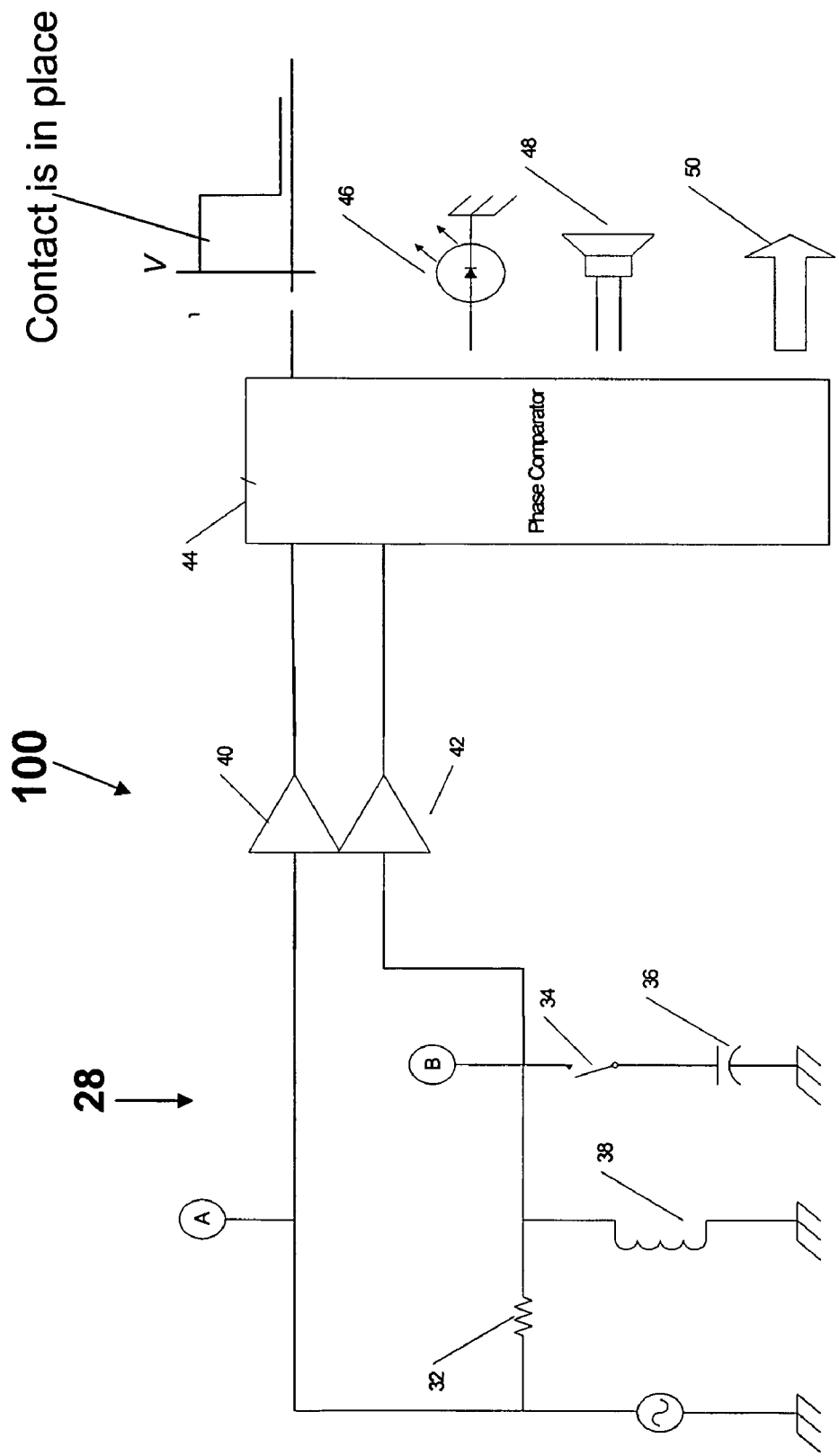
FIG. 4 illustrates an example of an embodiment of a device for monitoring the ground connection of a piece of equipment with an insulative bearing

FIG. 4 illustrates an example of an embodiment of a device 100 for monitoring the ground connection of a piece of equipment with an insulative bearing. The circuit 28 may output signals at points A and B (as described above with respect to FIG. 2) and the sign pass through a set of optional amplifiers 40 and 42 that amplify the signals. The outputs from points A and B (or the outputs from the optional amplifiers) are fed into a set of inputs of a typical phase comparator 44 that may be implemented as a commonly known circuit built using an XOR gate (described at http://www.uoguelph.ca/~antoon/gadgets/pll/pll.html or at http://ocw.mit.edu/NR/rdonlyres/Electrical-Engineering-and-Computer-Science/6-33Advanced-Circuit-TechniciuesSpring2002/80219724-F666489D-8564-8B8E5DC94BCC/0/lab3.pdf.) If the phases of the signals are the same or within an acceptable limit, the phase comparator 44 indicates failure of ground connection with no signal. If the phase difference between the signals exceeds a preset limit, this indicates a good connection between the contact 34 to ground which is output at a stepped voltage signal as shown. Typically, the difference between capacitance from the connector to ground in pass and in fail state is substantial. The typical parasitic capacitance between the moving member and the stationary member of one type of air-bearing spindle is in the range of 1000 to 4000 pF, depending on construction, while the capacitance to ground of the connector that is disengaged from the moving member is a few picofarads. Therefore, it is reasonable to anticipate a substantial phase difference between these two instances. It is prudent, however, to assess the parasitic capacitance and the resulting phase difference for each type of equipment since each type of equipment may have a different parasitic capacitance and therefore a different phase difference. Then, it is possible to make a device in accordance with the invention that will be able to monitor the parasitic capacitance (and phase difference) for most, if not all, of the difference pieces of equipment with insulative bearings despite the parasitic capacitance differences. The device 100 may optionally include an LED 46 and/or a buzzer 48 that indicate the pass/fail condition of the ground connection. An output signal 50 from the device 100 can be used for various purposes such as an external alarm, emergency stop of the tool, etc.

Figure 5:
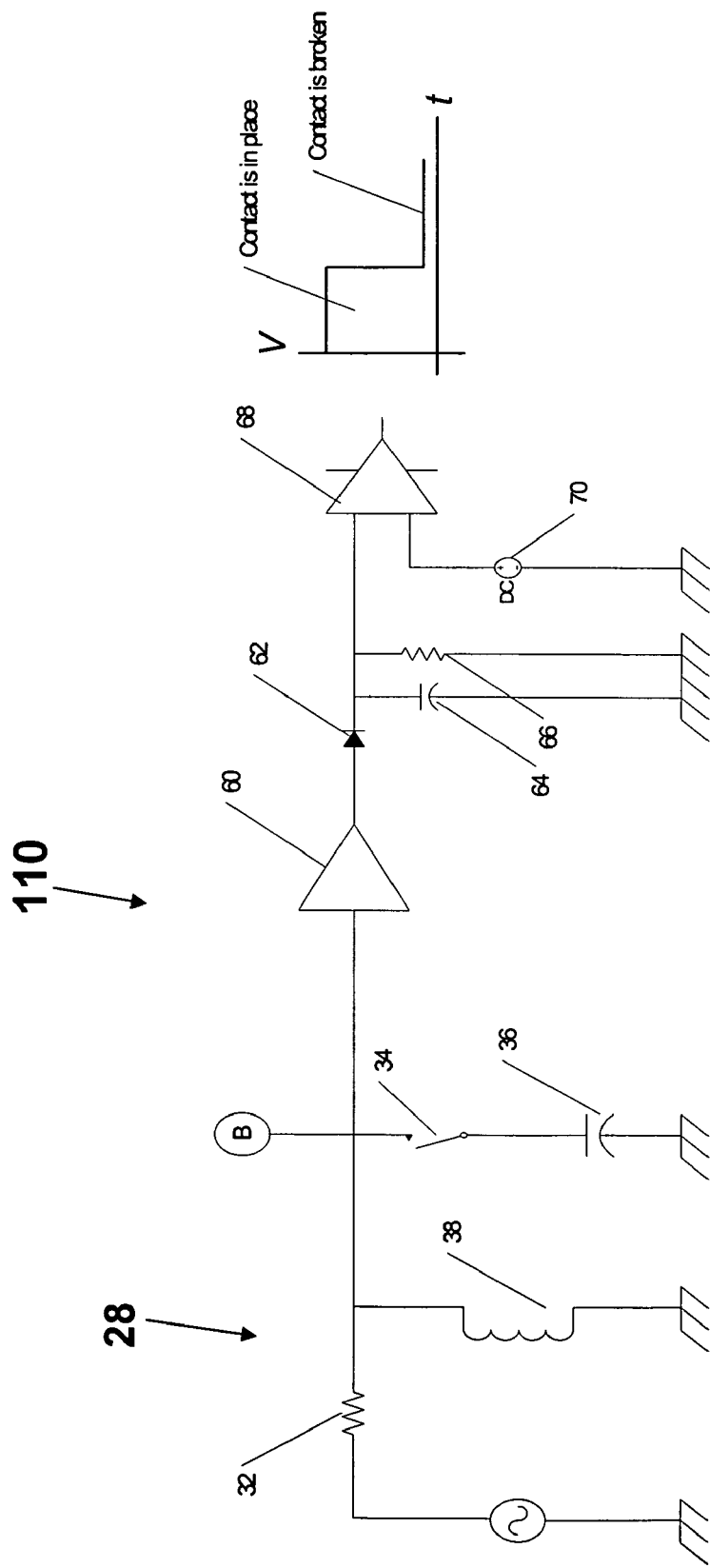
FIG. 5 illustrates an example of another embodiment of a device for monitoring the ground connection of a piece of equipment with an insulative bearing.

FIG. 5 illustrates an example of another embodiment of a device 110 for monitoring the ground connection of a piece of equipment with an insulative bearing. This device relies on the amplitude change of the signals to monitor the ground connection. In this device, the signal from the contact 34 (point B in the circuit 28) passes through an optional amplifier 60 (to amplify the signal as needed) and then is rectified by a circuit that may, for example, include a diode 62, a capacitor 64 and a resistor 66. The output of the rectifier is connected to a first input of a comparator 68 (implemented as an operational amplifier) and a second input of the comparator is connected to a reference voltage 70. If the connection between the contact 34 and the rotor is good, the signal at the contact is low and the comparator 68 will indicate that it is below the set reference level (shown as a high output signal). If connection between the contact and the rotor is interrupted, the signal at the contact is high and the comparator indicates the failure status by a low output signal. As with FIG. 4, this device 110 may have the same outputs, LEDs, buzzers, etc. as was shown in FIG. 4.

Figure 6:
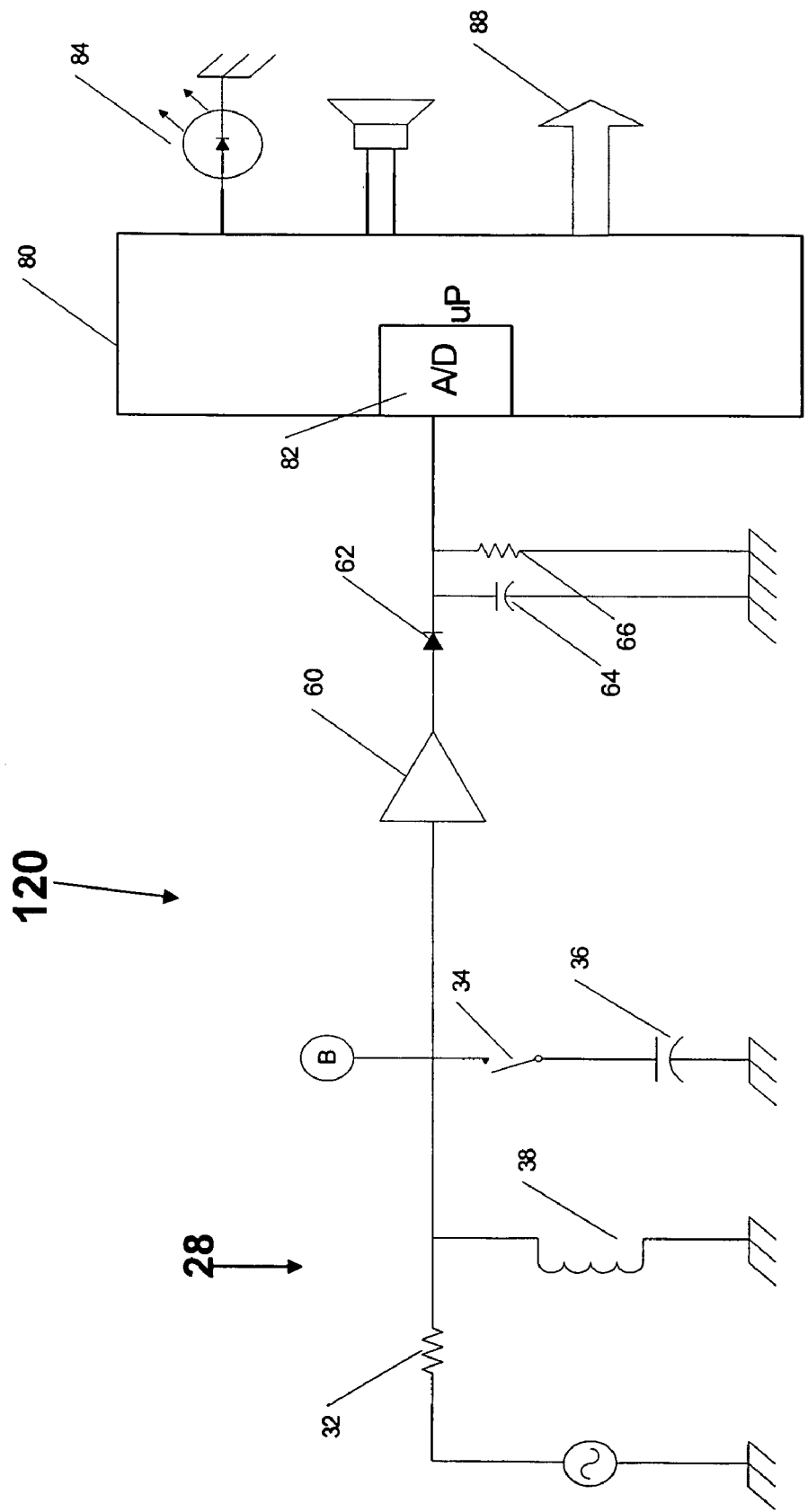
FIG. 6 illustrates an example of yet another embodiment of a device for monitoring the ground connection of a piece of equipment with an insulative bearing.

FIG. 6 illustrates an example of yet another embodiment of the a device 120 for monitoring the ground connection of a piece of equipment with an insulative bearing. In this device 120, the output from the circuit components 60-66 (shown in FIG. 5) is provided to an input of a processing unit 80, such as a microprocessor, with a built-in A/D converter 82. This device 120 performs the same function as the device shown in FIG. 5 and can also provide advance warning of worsening of contact between button and rotor as indicated by a change in the signal that can be more precisely measured and monitored by the processing unit 80.

Figure 7:
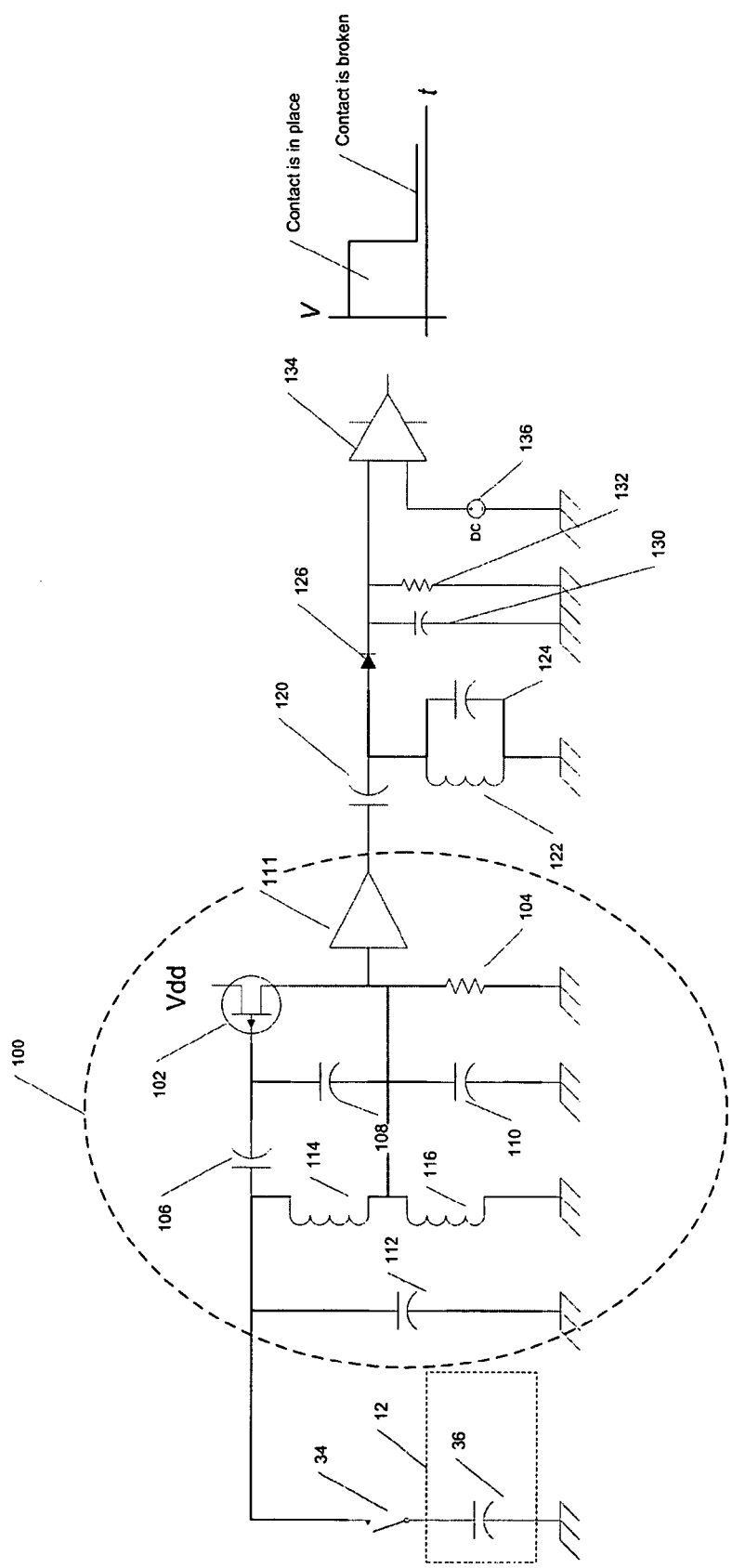
FIG. 7 illustrates an example of yet another embodiment of a device for monitoring the ground connection of a piece of equipment with an insulative bearing.

FIG. 7 shows yet another method of monitoring the ground connection of the moving member. In this method, the ground connection is measured based on altering the oscillator frequency by changing the value of a capacitor that determines the frequency of the oscillator. While many types of such oscillators are generally known and may be used for the above method, a Collpitz LC oscillator 100 is shown for illustration. This oscillator 100 is comprised of a transistor 102, resistor 104, capacitors 106, 108, 110 and 112 and inductors 114 and 116. Operation of such oscillator is widely known and is not a subject of this invention. The inductors 114 and 116 provide ground path for rotor 36. A capacitance 36 formed by the rotor and the stator also participates in defining the oscillation frequency. Depending on a contact 34, the capacitor 36 is either in the circuit or not, thus changing the oscillator frequency. Therefore, by knowing the oscillator frequency, it is possible to know whether the rotor is adequately grounded or not.

In FIG. 7, the output of the oscillator 100 is connected to an optional buffer 111 that reduces the influence of load on frequency of the oscillation. The output of the buffer 111 is connected to a bandpass filter comprised of capacitor 120 and LC tank using inductor 122 and capacitor 124. The output of the filter is then rectified by a diode 126 and filtered with capacitor 130 and resistor 132. This bandpass filter is tuned to the frequency of oscillation when the contact of the rotor with ground is satisfactory. Thus, when the rotor is properly grounded, the frequency of oscillator is the same or sufficiently close to the frequency of the bandbass filter and the output of the detector is high. If the ground of the rotor is disconnected, the frequency of oscillation changes and the output of the detector is low. This status is detected by a comparator 134 which has a reference voltage 136 connected to its second input to define the threshold voltage of good ground status. It should be noted that other types of oscillators can be equally used, such as the one built on common 555 timer, as well as other solutions FIG. 8A depicts a solution similar to those of FIG. 7, but with different way of determining frequency deviation. In FIG. 8A, the device has the same oscillator 100 with the same elements as those shown in FIG. 7 although the particular elements of the oscillator are not labeled in FIG. 8A. For this device, instead of a bandpass filter and detector, a frequency counter 140 is used. As shown in FIG. 8B, a method 142 for measuring the ground connection is shown using the device of FIG. 8A. In the method, the frequency of the oscillator is compared to a reference voltage in step 144. If the frequency of oscillation is within acceptable limits (tested in step 146), then the ground condition is determined to be satisfactory and the method 142 loops back to step 144. If the frequency is different, an alarm is issued in step 148. The device of FIG. 8A may be easily implemented using a microcontroller.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An object, comprising:
a moving member;
a stationary member separated from the moving member by an insulative bearing and electrically connected to the moving member; and
a circuit that measures a parasitic capacitance between the moving member and the stationary member in order to determine a ground connection to the moving member,
wherein the circuit further comprises an output signal whose amplitude changes depending on the grounding connection of the moving member,
wherein the circuit further comprises a rectifier circuit that rectifies the output signal to generate a rectified output signal and a device that compares the amplitude of the rectified output signal and a reference signal to generate a comparator output signal that indicates the grounding connection of the moving member, and
wherein the rectifier circuit further comprises a diode coupled to the output signal, a capacitor and a resistor in parallel, coupled between an output of the diode and ground.

2. An object comprising:
a moving member;
a stationary member separated from the moving member by an insulative bearing and electrically connected to the moving member; and
a circuit that measures a parasitic capacitance between the moving member and the stationary member in order to determine a ground connection to the moving member,
wherein the circuit further comprises an oscillator that generates a signal having a frequency wherein the frequency of the oscillator depends on the connection to the moving member, and
wherein the circuit further comprises a bandpass filter coupled to the oscillator wherein the bandpass filter is tuned to a frequency of the oscillator when a good connection to the moving member exists and an output signal from the bandpass filter is compared to a reference signal to generate a signal indicating a status of the connection to the moving member.

3. An object, comprising:
a moving member;
a stationary member separated from the moving member by an insulative bearing and electrically connected to the moving member; and
a circuit that measures a parasitic capacitance between the moving member and the stationary member in order to determine a ground connection to the moving member,
wherein the circuit further comprises an oscillator that generates a signal having a frequency wherein the frequency of the oscillator depends on the connection to the moving member, and
wherein the circuit further comprises a frequency counter coupled to the oscillator that determines the frequency of the oscillator and generates a signal indicating a status of the connection to the moving member.

4. A device of monitoring the grounding of an object having a moving member and a stationary member separated by an insulative bearing and electrically connected to the moving member, the device comprising:
a circuit that measures a parasitic capacitance between a moving member and a stationary member; and
a ground circuit that indicates a ground connection to the moving member,
wherein the circuit that determines the grounding connection further comprises an output signal whose amplitude changes depending on the grounding connection of the moving member,
wherein the circuit that determines the grounding connection further comprises a rectifier circuit that rectifies the output signal to generate a rectified output signal and a device that compares the rectified output signal and a reference signal to generate a comparator output signal that indicates the grounding connection of the moving member, and
wherein the rectifier circuit further comprises a diode coupled to the output signal, a capacitor and a resistor in parallel, coupled between an output of the diode and ground.

5. A device of monitoring the grounding of an object having a moving member and a stationary member separated by an insulative bearing and electrically connected to the moving member, the device comprising:
a circuit that measures a parasitic capacitance between a moving member and a stationary member; and
a ground circuit that indicates a ground connection to the moving member, wherein the circuit further comprises an oscillator that generates a signal having a frequency wherein the frequency of the oscillator depends on the connection to the moving member, and wherein the circuit further comprises a bandpass filter coupled to the oscillator wherein the bandpass filter is tuned to a frequency of the oscillator when a good connection to the moving member exists and an output signal from the bandpass filter is compared to a reference signal to generate a signal indicating a status of the connection to the moving member.

6. A device of monitoring the grounding of an object having a moving member and a stationary member separated by an insulative bearing and electrically connected to the moving member the device comprising:

a circuit that measures a parasitic capacitance between a moving member and a stationary member; and a ground circuit that indicates a ground connection to the moving member, wherein the circuit further comprises an oscillator that generates a signal having a frequency wherein the frequency of the oscillator depends on the connection to the moving member, and wherein the circuit further comprises a frequency counter coupled to the oscillator that determines the frequency of the oscillator and generates a signal indicating a status of the connection to the moving member.

7. A method for monitoring the grounding of an object having a moving member and a stationary member separated by an insulative bearing and electrically connected to the moving member, the method comprising:

measuring a parasitic capacitance between the moving member and the stationary member of the device; and determining a grounding connection to the moving member based on the measured parasitic capacitance, wherein determining the ground connection further comprises generating, using an oscillator, a signal having a frequency wherein the frequency of the oscillator depends on the connection to the moving member, and wherein determining the ground connection further comprises tuning a bandpass filter to a frequency of the oscillator when a good connection to the moving member exists and comparing an output signal from the bandpass filter to a reference signal to generate a signal indicating a status of the connection to the moving member.

8. A method for monitoring the grounding of an object having a moving member and a stationary member separated by an insulative bearing and electrically connected to the moving member, the method comprising:

measuring a parasitic capacitance between the moving member and the stationary member of the device; and determining a grounding connection to the moving member based on the measured parasitic capacitance, wherein determining the ground connection further comprises generating, using an oscillator, a signal having a frequency wherein the frequency of the oscillator depends on the connection to the moving member, and wherein determining the ground connection further comprises using a frequency counter coupled to the oscillator to determine the frequency of the oscillator and generate a signal indicating a status of the connection to the moving member.

* * * * *

UNITED STATES PATENT AND TRADEMARK OFFICE
CERTIFICATE OF CORRECTION

PATENT NO. : 7,589,537 B1  Page 1 of 2
APPLICATION NO. : 11/400164
DATED : September 15, 2009
INVENTOR(S) : Vladimir Kraz It is certified that error appears in the above-identified patent and that said Letters Patent is hereby corrected as shown below:

Title Page,
Item [56] References Cited, under U.S. Patent Documents, please add the following reference that was considered by the examiner but does not appear on the printed patent: --"Ground Master® Equipment Ground Monitors – Know whether your equipment is properly grounded at all times" - ©2004, Credence Technologies, Inc.--.

Column 2,
Line 43, delete "bearing" and insert --bearing;-- therefor.

Column 3,
Line 33, delete "3a" and insert --3a.-- therefor.

Column 3,
Line 52, delete "sign" and insert --signals-- therefor.

Column 3,
Lines 59-60, delete "33Advanced" and insert --331Advanced-- therefor.

Column 3,
Line 60, delete "Techniciues" and insert -Techniques-- therefor.

Column 3,
Line 61, delete "F666489D" and insert --F666-489D-- therefor.

Column 4,
Line 44, delete "the a" and insert --a-- therefor.

Column 4,
Line 60, delete "Collpitz" and insert --Colpitts-- therefor.

Signed and Sealed this

Twenty-sixth Day of October, 2010

David J. Kappos
*Director of the United States Patent and Trademark Office*

Column 5,
Line 15, delete "bandbass" and insert --bandpass-- therefor.

Column 5,
Line 23, delete "solutions" and insert --solutions.-- therefor.

Column 6,
Line 1, in Claim 2, delete "object" and insert --object,-- therefor.

Column 7,
Line 15, in Claim 6, delete "member" and insert --member,-- therefor.